United States Patent [19]

Toda

[11] Patent Number: 4,930,722
[45] Date of Patent: Jun. 5, 1990

[54] DRAG MECHANISM FOR A SPINNING REEL

[75] Inventor: Junichi Toda, Sakai, Japan

[73] Assignee: Shimano Industrial Company Limited, Osaka, Japan

[21] Appl. No.: 169,875

[22] Filed: Mar. 18, 1988

[30] Foreign Application Priority Data

Mar. 24, 1987 [JP] Japan .................... 62-43221[U]
Mar. 24, 1987 [JP] Japan .................... 62-43222[U]
Dec. 26, 1987 [JP] Japan .................... 62-198576[U]

[51] Int. Cl.⁵ ................. A01K 89/01; A01K 89/02
[52] U.S. Cl. ............................. 242/245; 242/223; 242/246
[58] Field of Search ............... 242/217, 218, 84.5 R, 242/84.5 A, 84.51 R, 84.51 A, 84.5 P

[56] References Cited

U.S. PATENT DOCUMENTS

| | | | |
|---|---|---|---|
| 2,558,896 | 7/1951 | Young | 242/84.21 R |
| 4,124,174 | 11/1978 | Kelly . | |
| 4,153,219 | 5/1979 | Kamikawa | 242/84.51 R |
| 4,391,419 | 7/1983 | Iwama | 242/84.5 R |
| 4,422,600 | 12/1983 | Preston . | |
| 4,555,072 | 11/1985 | Hitomi | 242/84.5 P |
| 4,702,413 | 10/1987 | Kaneko | 242/84.21 R |
| 4,728,053 | 3/1988 | Hitomi | 242/84.5 A |

FOREIGN PATENT DOCUMENTS

| | | |
|---|---|---|
| 583350 | 12/1946 | United Kingdom . |
| 1147107 | 4/1969 | United Kingdom . |
| 1345553 | 1/1974 | United Kingdom . |
| 2179753 | 3/1987 | United Kingdom . |
| 2181331 | 4/1987 | United Kingdom . |

Primary Examiner—Katherine A. Matecki
Attorney, Agent, or Firm—Dickstein, Shapiro & Morin

[57] ABSTRACT

A drag mechanism for a spinning reel which is provided at one of a stationary said member stationary with respect to a spool with a reference portion for the optimum braking force and at the other with a position setting portion corresponding to said reference portion, thereby indicating the position of an adjuster corresponding to the optimum braking force.

3 Claims, 6 Drawing Sheets

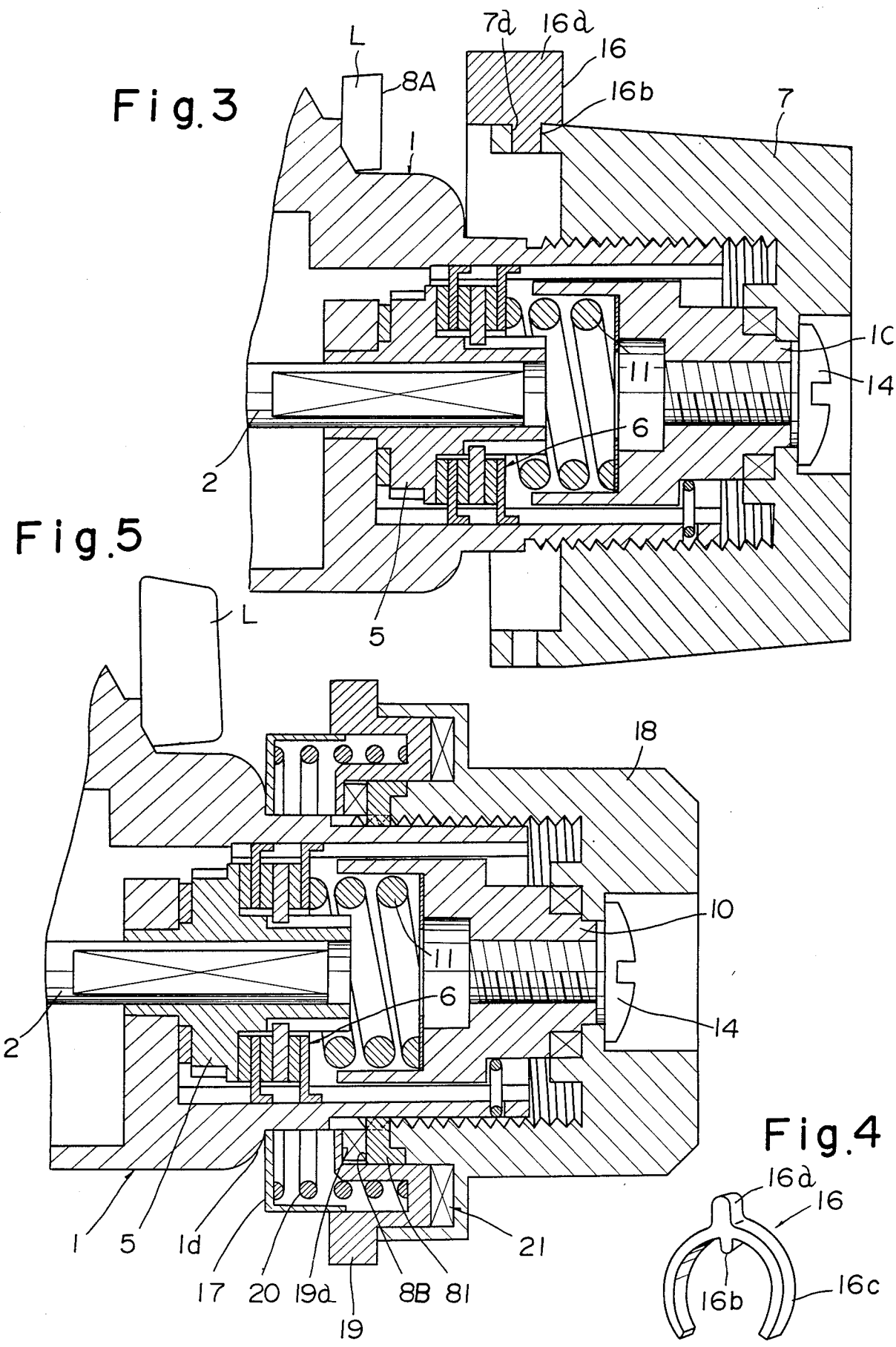

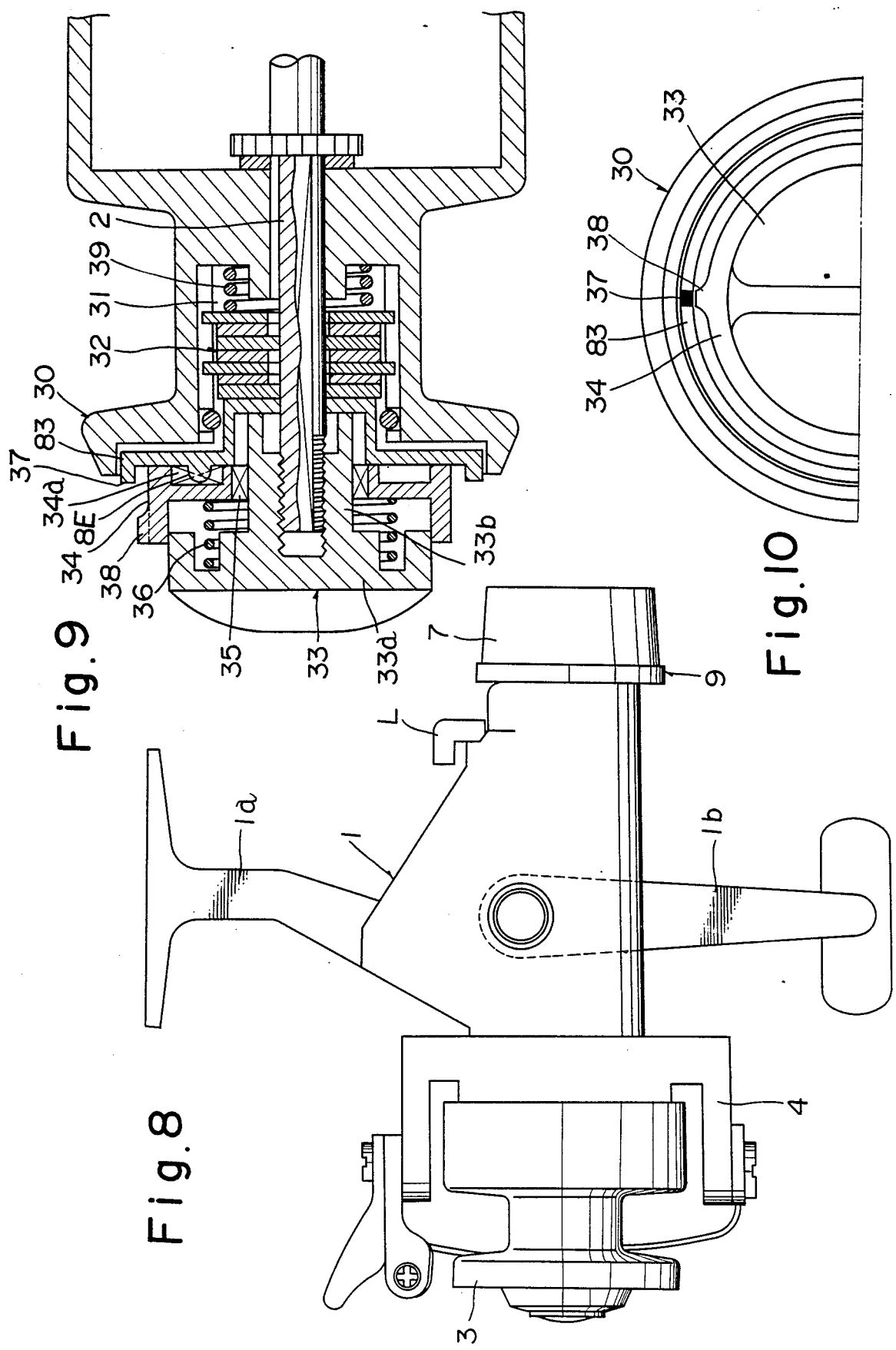

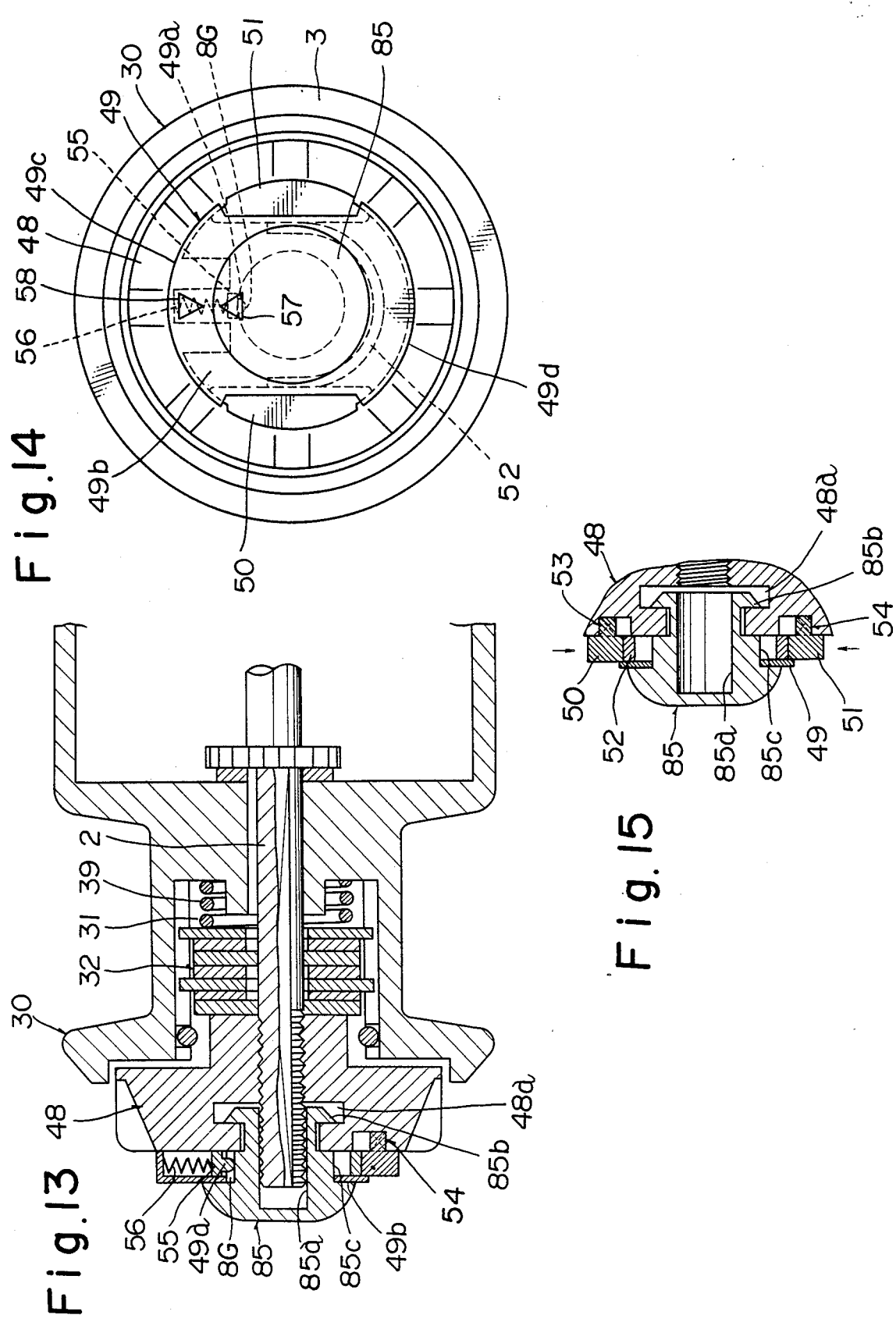

4,930,722

DRAG MECHANISM FOR A SPINNING REEL

FIELD OF THE INVENTION

The present invention relates to a drag mechanism at a spinning reel, and more particularly to a drag mechanism applying a braking force to rotation of a spool at the spinning reel.

BACKGROUND OF THE INVENTION

Generally, this kind of drag mechanism at the spinning reel is provided with dragging members for applying the braking effect to rotation of the spool and an adjuster for adjusting a braking force of the dragging members, the adjuster rotating to adjust the braking force of the dragging members, thereby adjusting the braking effect to the spool.

Such spinning reel presets an initial braking force against starting rotation of the spool, that is, the initial braking force of the dragging members, to the optimum value corresponding to a target fish, the braking force of the dragging member being adjusted by the adjuster on the basis of the preset value.

The spinning reel provided with the drag mechanism, which presets the initial braking force as above-mentioned, adjusts the braking force of the dragging member by the adjuster for fishing. In this case, it is desirable that, for example, when an angler wants to catch the same kind of fishes, he sets the optimum initial braking force corresponding to the target fish and returns the adjuster, even when temporarily adjusted, to the position where the optimum braking force is obtained.

The adjuster, however, is rotatably adjustable in a range of the maximum braking force to the minimum one of the dragging members, whereby it is difficult for the adjuster to return, after adjusted corresponding to a pulling force of a hooked fish, to the position where the optimum initial braking force is reobtained. Hence, the problem has been created in that, even when the angler intends to catch the same kind of target fishes about equal in the pulling force when hooked, the adjuster shifts each time so as not to obtain a proper braking force.

SUMMARY OF THE INVENTION

In the light of the above problem, the present invention has been designed. An object thereof is to provide a spinning reel which is simply changed in design to keep the adjuster in the position where the optimum braking force is always obtainable.

The spinning reel of the invention which is provided with dragging members for applying a braking force to rotation of a spool and an adjuster for adjusting the braking force of the dragging member, is characterized in that one of a stationary side member with respect to the spool and the adjuster, is provided with a reference portion to indicate the position where the optimum braking force is obtained, and the other with a position setting member corresponding to the reference portion, the reference portion or the position setting member being shiftable with respect to the stationary side member or the adjuster.

The adjuster can simply and accurately be positioned to obtain the optimum initial braking force in such a manner that, after the initial braking force is set, the reference portion or the position setting member is shifted.

The above and further objects and novel features of the invention will more fully appear from the following detailed description when the same is read in connection with the accompanying drawings.

BRIEF DESCRIPTION OF THE DRAWINGS

FIGS. 2 and 3 are longitudinally sectional views of second and third embodiments of the invention respectively, FIG. 4 is a perspective view of a position setting member used in the third embodiment in FIG. 3, FIGS. 5, 6 and 7 are longitudinally sectional views of fourth, fifth and sixth embodiments of the invention respectively, FIG. 8 is a side view showing an entire construction of the spinning reel, FIG. 9 is a longitudinally sectional view of a seventh embodiment of the invention, FIG. 10 is a partially omitted side view thereof, FIG. 13 is a longitudinally sectional view of a ninth embodiment of the invention, FIG. 14 is a side view thereof, and FIG. 15 is a cross-sectional view of the principal portion of the FIG. 13 embodiment.

DETAILED DESCRIPTION OF THE INVENTION

Figure 7:
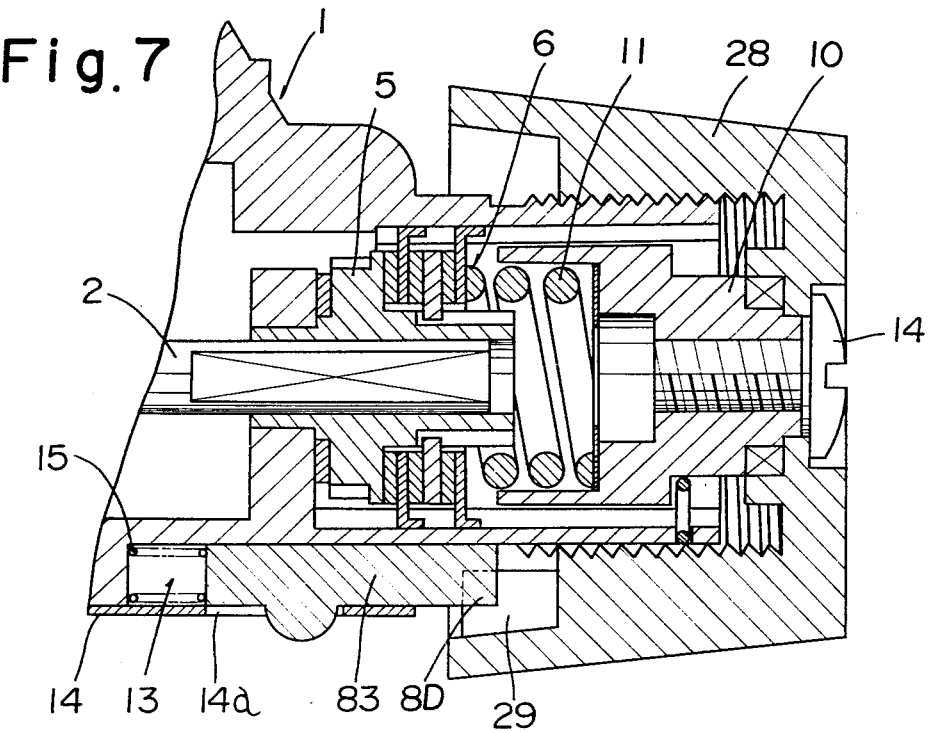

A spinning reel provided with the drag mechanism of the invention, as shown in FIG. 7, is so constructed that a reel body 1 has a mounting leg 1a for mounting the reel to a fishing rod and rotatably supports an operating handle 1b and a rotary frame 4, a spool shaft 2 axially movable by operating the handle 1b through a reciprocation mechanism is supported in the reel body 1 in relation of being rotatable and axially movable through a rotary cylinder 5, a spool 3 is mounted on the foremost end of the spool shaft 2, and a drag mechanism, which applies a braking force to the rotation of spool 3, is mounted on the rear portion of the reel body 1.

Figure 1:
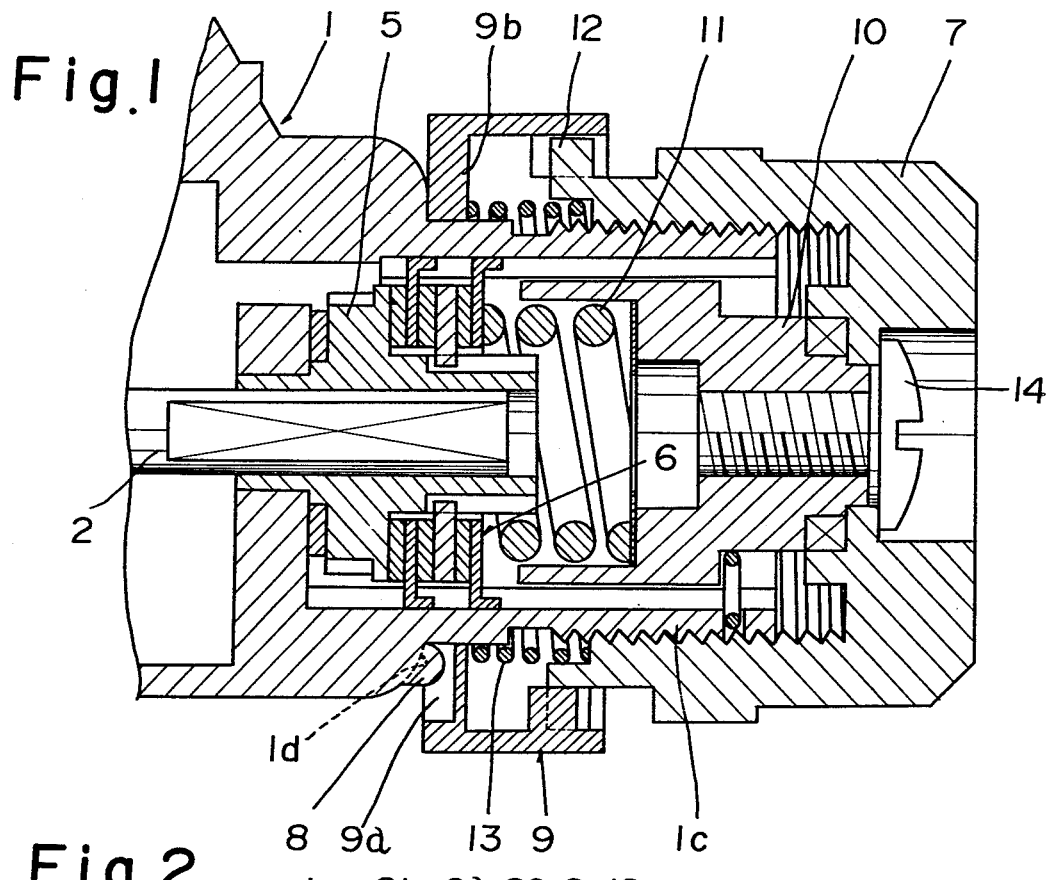
FIG. 1 is a longitudinally sectional view of a first embodiment of a drag mechanism for a spinning reel of the invention.

A support cylinder 1c, as shown in FIG. 1, projects rearwardly from the reel body 1, a plurality of dragging members 6 are interposed between the inner periphery of the support cylinder 1c and the outer periphery of the rotary cylinder 5 sleeved not-relative-rotatably onto the spool shaft 2, and an adjuster 7 for adjusting the braking force of the dragging members 6 is screwed with the outer periphery of the support cylinder 1c, so that the adjuster 7 is rotated to adjust the braking force of dragging members 6. In the embodiments of the invention shown in FIGS. 1 through 7, the spinning reel constructed as the above-mentioned is provided at the reel body 1 not-rotatable with respect to the dragging members 6 with a reference portion 8, and the adjuster 7 is provided with a position setting member 9 having a position setting portion 9a corresponding to the reference portion 8, the position setting member 9 being shiftable with respect to the reel body 1.

In detail, the spinning reel shown in FIG. 1 is provided in the support cylinder 1c with an urging member 10 rotatable and opposite to the dragging member 6, a coil spring 11 is interposed between the urging portion 10 and the dragging members 6, and the rear portion of urging member 10 is fixed to the adjuster 7 through a tightening bolt 14, so that the adjuster 7 is screwably adjusted with respect to the reel body 1 so as to adjust through the urging member 10 a biasing force of the coil spring 11 with respect to the dragging members 6, thereby adjusting the braking force thereof.

Also, the reference portion 8 of a ball-like-shape is formed integrally with the lower portion of a rear wall 1d of the reel body 1 opposite to the adjuster 7.

The position setting member 9 is cylindrical and has a side wall 9b at one axial end and is sleeved rotatably between the reel body 1 and the adjuster 7 so that the side wall 9b is opposite to the rear surface 1d, and engaging portions 12 of spline structure are formed between the inner periphery at the rear side of position setting member 9 and the outer periphery at the front side of adjuster 7, the engaging portions 12 engaging with each other to allow the position setting member 9 to rotate together with the adjuster 7. The position setting member 9 axially (rightwardly in FIG. 1) moves to disengage the engaging portions 12 so as to be rotatable with respect to the adjuster 7, and is provided at a portion of the front surface of the side wall 9b with the recessed position setting portion 9a engageable with the reference portion 8.

A coil spring 13 is interposed between the adjuster 7 and the position setting member 9 and biases the latter always toward the rear surface 1d of the reel body 1, thereby holding the engaging portions 12 always in engagement with each other. The position setting member 9 is moved toward the adjuster 7 against the spring 13, thereby disengaging the engaging portions 12 from each other.

The spinning reel constructed as above-mentioned screwably moves the adjuster 7 with respect to the reel body 1 so that the initial braking force is set corresponding to the target fish, at which time the engaging portions 12 are held in engagement with each other by the biasing force of spring 13, whereby the position setting member 9 rotates together with the adjuster 7 in the state where the position setting Portion 9a at the position setting member 9 rides over the reference portion 8 at the reel body 1. In this case, the rotation of adjuster 7 together with the position setting member 9 will shift the position setting portion 9a with respect to the reference portion 8, but the optimum initial braking force of the dragging members 6 for the spool 3 can be set.

After the initial braking force of the dragging members 6 is set, the position setting member 9 is moved toward the adjuster 7 against the spring 13 and rotates in condition of disengaging the engaging portions 12, thereby engaging the position setting portion 9a with the reference portion 8.

Thus, during the fishing, the adjuster 7 is rotatably operated on the basis of the engaging position of the reference portion 8 with the position setting portion 9a, so that the braking force of the dragging members 6 is adjusted with respect to an initial load. After a fish is caught, the adjuster 7 is returned to the position where the position setting portion 9a engages with the reference portion 8, thereby enabling the adjuster 7 to be put in the optimum position where the preset initial braking force is again obtained.

Alternatively, in the FIG. 1 embodiment, the reference portion 8 and position setting portion 9a may not engage but coincide with each other. Or, the reference portion 8 may be provided at the position setting member 9 and the position setting portion 9a to the reel body 1.

Figure 2:
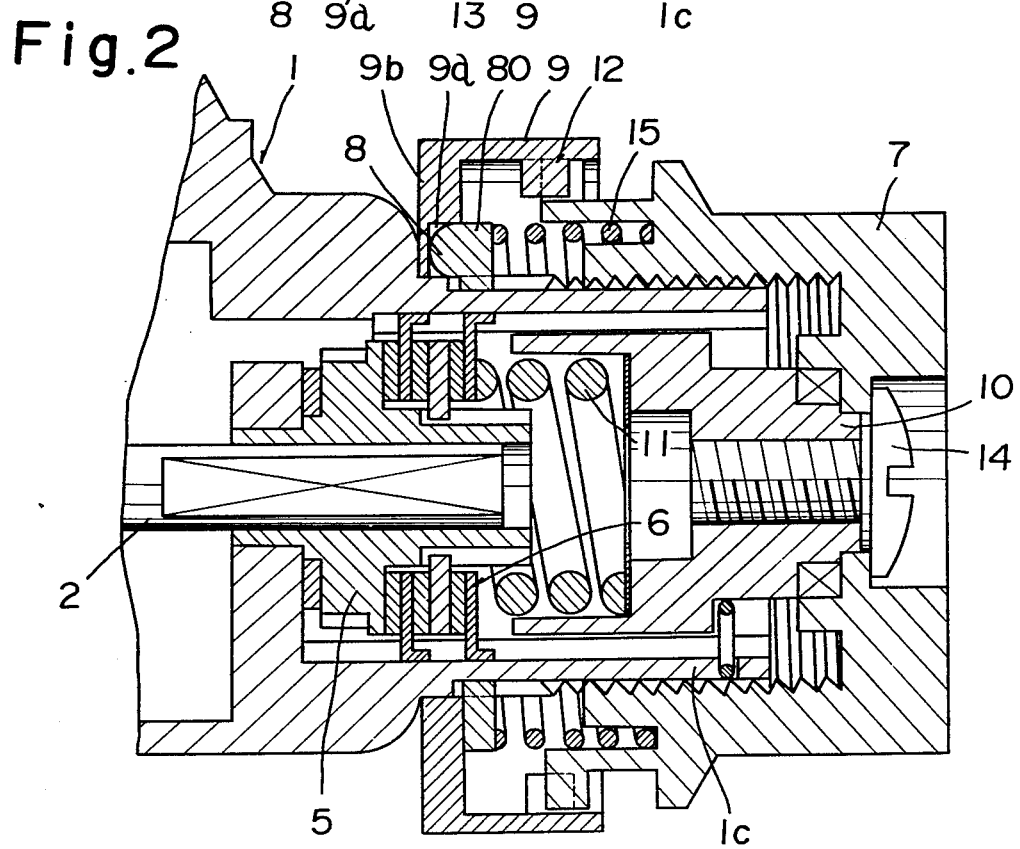

Next, a second embodiment of the invention shown in FIG. 2 will be described, in which a position setting portion 9a is recessed at the inner surface of the side wall 9b at the position setting member 9 in the first embodiment, at the outer periphery of the support cylinder 1c is supported not-rotatably but axially movably an annular reference member 80 having a reference portion 8 engageable with the position setting portion 9a, and a spring 15 is interposed between the adjuster 7 and the reference member 80 so as to bias the reference member 80 to always engage with the position setting portion 9a.

Thus, the adjuster 7, as the same as the first embodiment shown in FIG. 1, is screwably operated with respect to the reel body 1 to thereby set the initial braking force of the dragging members 6 corresponding to the target fish.

Also, after the initial braking force of the dragging members 6 is set, the position setting member 9 and reference member 80 are moved toward the adjuster 7 against the spring 15 and rotated in condition of disengaging the engaging portions 12 from each other, thereby engaging the position setting portion 9a with the reference portion 8.

FIG. 3 shows a third embodiment of the invention, in which an existing part, such as an anti-reverse-rotation lever L, is used as a reference portion 8A, a plurality of fitting bore 7a are provided at the foremost end of the adjuster 7 circumferentially spaced at predetermined intervals, and a semicircular position setting member 16 having a projection 16b engageable with one of the fitting bores 7a and a position setting portion 16a is supported to the adjuster 7 in relation of being shiftable.

The position setting member 16, as shown in FIG. 4, has legs 16c each substantially in a circular arc and open at the lower ends, the legs 16c are elastically deformed to be fitted onto the outer periphery of the fore end of adjuster 7, the fitting projection 16b is formed integrally with the lower side of the upper center of the position setting member 16, and a position setting portion 16a projects upwardly from the upper side of the upper center of the same.

The adjuster 7 is screwably operated with respect to the reel body 1, so that the position setting member 16 rotates together with the adjuster 7, thereby enabling the optimum braking force of the dragging members 6 to be set by the adjuster 7.

After the initial braking force of the dragging members 6 is set, the position setting portion 16a is pinched up to disengage the fitting projection 16b from the fitting bore 7a, and the position setting member 16 is rotated to align the position setting portion 16a with the reference portion 8A so as to fit the fitting projection 16b into one fitting bore 7a.

Thus, during the fishing, the position setting portion 16a is rotated to align with the reference portion 8, whereby the adjuster 7 can exactly be returned to the position where the preset initial braking force is obtained.

FIG. 5 shows a fourth embodiment, in which a cylindrical spring holder 17 is provided at the rear surface 1d of the reel body 1, a position setting member 19 having a position setting portion 19a is rotatably supported to the outer periphery of the support cylinder 1c between the spring holder 17 and an adjuster 18, between the position setting member 19 and the adjuster 18 is not-rotatably but axially movably supported a reference member 81 having a reference portion 8B engageable with the position setting portion 19a, and a spring 20 is interposed between the position setting member 19 and the spring holder 17 so as to bias the position setting portion 19a to always engage with the reference portion 8B.

Also, engaging portions 21 of spline construction are formed between the adjuster 18 and the positioning member 19 so that the spring 20 biases the engaging portions 21 to engage with each other.

The adjuster 18, as the same as the first embodiment in FIG. 1, is screwably operated with respect to the reel body 1 to set the initial braking force of the dragging members 6 corresponding to the target fish. Since the engaging portions 21 are held by the spring 20 in engagement with each other, the position setting member 19 rotates together with the adjuster 18 in the state where the position setting portion 19a rides over the reference portion 81.

After the initial braking force of the dragging members 6 is set, the position setting member 19 is moved away from the reference member 81 (leftwardly in FIG. 5) against the spring 20 and rotated in condition of disengaging the engaging portions 21 from each other, thereby engaging the position setting portion 19a with the reference portion 8B.

The reference portion 8B is provided to coincide at the circumferential position with an anti-reverse-rotation lever L mounted on the reel body 1, so that even when the reference portion 8B is not viewed from the exterior, the adjuster 18 is rotated with the lever L as a guide and the adjuster 18 can be put in the optimum position where the preset initial load is obtained, and the position setting portion 19a can engage with the reference portion 8B.

Figure 6:
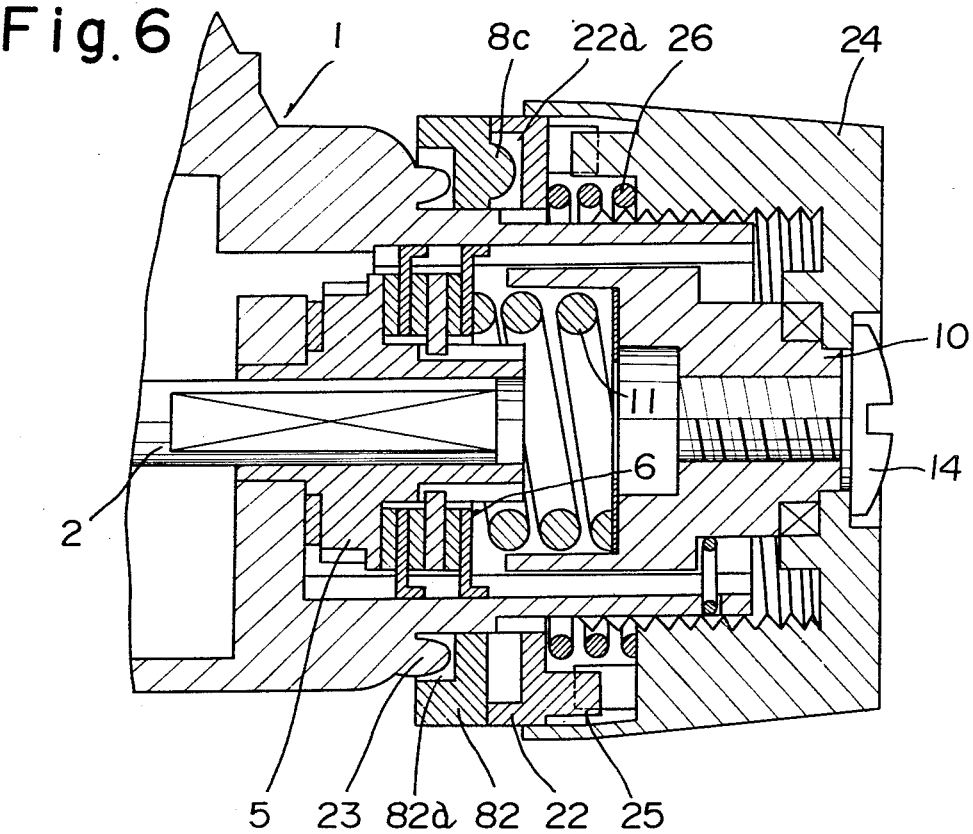

FIG. 6 shows a fifth embodiment of the invention, in which a reference member 82 having a reference portion 8C and a positioning member 22 having a plurality of position setting portions 22a each engageable with the reference portion 8C are rotatably supported on the outer periphery of the support cylinder 1c, at the front side of the reference member 82 are formed a plurality of engaging portions 82a engageable with a plurality of projections 13 provided at the rear surface 1d of the reel body 1, and between the rear surface of the position setting member 22 and the front surface of an adjuster 24 are formed engaging portions 25 which engage with each other to rotate the position setting member 22 together with the adjuster 24.

Also, between the adjuster 24 and the position setting member 22 is interposed a spring 26, through which the position setting portion 22a always engages with the reference portion 8C and each engaging portion 82a elastically engages with each projection 23 at the reel body 1.

Thus, the adjuster 24, as the same as the first embodiment in FIG. 1, is screwably operated with respect to the reel body 1 to set the initial braking force of the dragging member 6 corresponding to the target fish. In this case, since the engaging portions 25 are held in engagement with each other, the position setting member 22 rotates together with the adjuster 24 in the state where each position setting portion 22a rides over the reference portion 8C, whereby the adjuster 24 together with the position setting member 22 rotates to enable the optimum braking force of the dragging members 6 to be set.

After the initial braking force of the dragging members 6 is set, the reference member 82 is forcibly rotated, so that the position setting member 22 moves backwardly toward the adjuster 24 against the spring 26 and simultaneously rotates in the stage where the engaging portion 82d at the reference member 82 rides over the projections 23 at the reel body 1 side respectively, thereby engaging the reference portion 8C with the position setting portion 22a.

During the fishing, the adjuster 24 is rotated so as to engage the position setting portion 22a with the reference portion 8C. thereby being restored exactly to the optimum position where the preset initial braking force is obtained.

Next, FIG. 7 shows a sixth embodiment of the invention, in which a reference member 83 having a reference portion 8D is supported to the reel body 1 in relation of being movable longitudinally thereof and biased always rearwardly by a spring 27, an adjuster 28 is provided with a position setting portion 29 engageable with the reference portion 8D and corresponding thereto, and the adjuster 28 is integral with the respective position setting members in FIGS. 1 through 5. In the sixth embodiment, as the same as the first and fifth embodiments, the optimum braking force can be set and the braking force can be indicated in position.

Alternatively, the rear drag mechanism of the dragging members and adjuster in the aforesaid embodiments may be provided as a front drag mechanism at the front side of the reel body 1 as shown in FIGS. 9 through 15.

Next, a seventh embodiment of the invention is shown in FIGS. 9 and 10, in which the spinning reel is so constructed that the spool shaft 2 is supported not-rotatably but axially movably to the reel body 1, a spool 30 is rotatably supported to the foremost end of the spool shaft 2, a plurality of dragging members 32 are interposed between the outer periphery of the spool shaft 2 and the inner periphery of a cavity 31 formed at the front end surface of spool 30, an adjuster 33 comprising a disc 33a having a knob and a cylinder 33b axially extending from one side of the disc 33a toward the spool 30, screws with one end of spool shaft 2 projecting forwardly with respect to the spool 30, a reference member 83 having a reference projection 8E is supported not-rotatably but axially movably to the spool shaft 2 between the adjuster 33 and the dragging members 32, the adjuster 33 screwing to axially move the reference member 83. Also, a position setting member 34 having recessed position setting portions 34a is supported onto the outer surface of the cylinder 33b axially movably through engaging portions 35 of spline structure, the position setting member 34 is rotatable with respect to the adjuster 33, and a spring 36 is interposed between the position setting member 34 and the adjuster 33 so as to always engage the position setting portion 34a with the reference portion 8E. Also, an index 37 is provided at one side of the reference member 83 and corresponding to the reference portion 8E, and an indicator 38 coincident with the index 37 is provided at one side surface of the positioning member 34 and positioned corresponding to the position setting portion 34a so that the position setting portion 34a is easy to view from the exterior with respect to the reference portion 8E. In addition, the outer periphery of the foremost end of spool shaft 2 is provided at both radial sides with flat surfaces to be not-round in section.

The adjuster 33 is screwably operated with respect to the spool shaft 2 so as to rotate together with the position setting member 34 through engaging portions 35 provided between the adjuster 33 and the positioning member 34, and the position setting portion 34a thereof disengages from the reference portion 8E, thereby enabling the optimum braking force of the dragging member 32 to be set. After the initial braking force of the dragging members 32 is set, the position setting member 34 is moved away from the reference member 83 against the spring 36 and the position setting member 34 is rotated with respect to the adjuster 33 in condition of disengaging the engaging portions 35 from each other, thereby engaging the position setting portion 34a with the reference portion 8E. In addition, in FIG. 9, a reference numeral 39 designates a drag spring.

Figure 11:
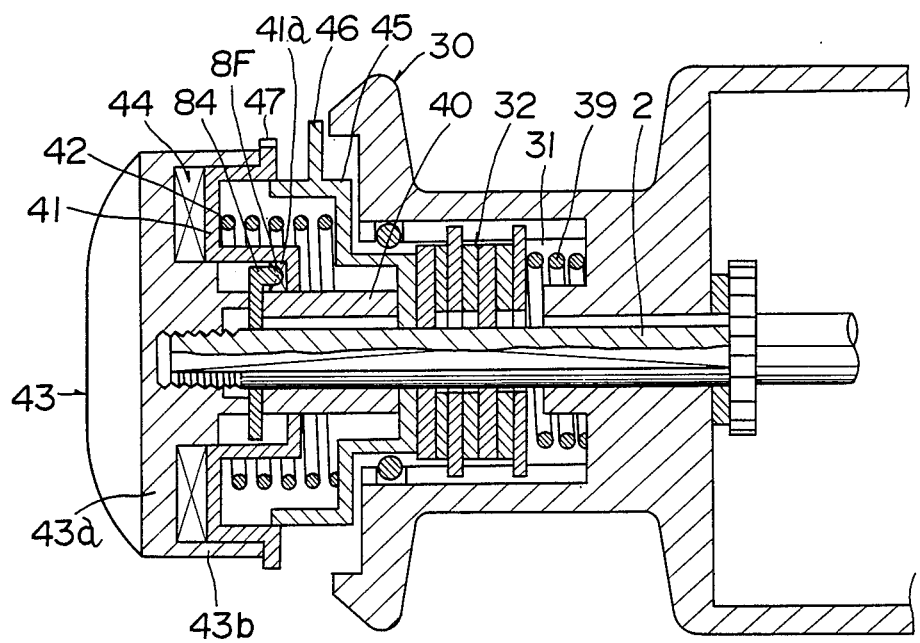
FIG. 11 is a longitudinally sectional view of a eighth embodiment of the invention.
Figure 12:
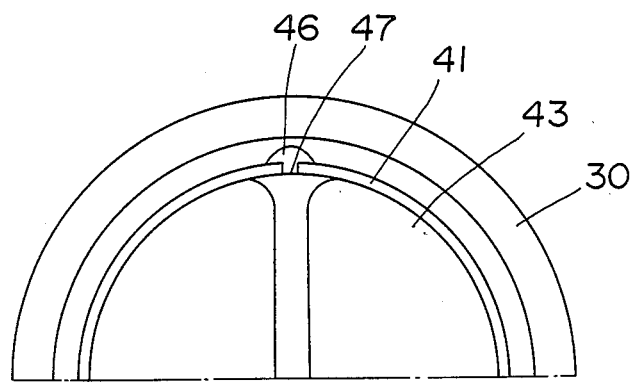
FIG. 12 is a partially omitted side view thereof.

An eighth embodiment of the invention shown in FIGS. 11 and 12 is biasically the same in construction as the seventh embodiment in FIG. 9, in which a sleeve 40 is provided axially movably between dragging members 32 and a reference member 84 not-rotatably but axially movably supported to the spool shaft 2, at the outer periphery of the sleeve 40 is rotatably and axially movably supported a position setting member 41 having a recessed position setting portion 41a engageable with a reference portion 8F, a spring 42 for biasing the position setting member 41 in the direction of engaging the position setting portion 41a thereof with the reference portion 8F is provided, and engaging portions 44 are provided between the position setting member 41 and an adjuster 43 having a disc 43a and a cylinder 43b, so that the spring 42 biases the engaging portions 44 to engage with each other. Also, a spring holder 45 for supporting one end of the spring 42 is not-rotatably but axially movably mounted on the spool shaft 2 between the sleeve 40 and the dragging members 32, an index 46 is provided at one side surface of the spring holder 45 and positioned corresponding to the reference portion 8F, and an indicator 47 coincident with the index 46 is provided at one side surface of the position setting member 41 and positioned corresponding to the position setting portion 41a, so that the position setting portion 41a is easy to view with respect to the reference portion 8F from the exterior.

In this embodiment, the adjuster 43 is screwably operated to axially move the reference member 84, sleeve 40 and spring holder 45, thereby enabling the initial braking force of the dragging members 32 to be set. The position setting member 41 rotates together with the adjuster 43 in condition of engaging the engaging portions 44 with each other to thereby disengage from the reference member 85. After the initial braking force is set, the positioning member 41 is axially moved against the spring 42 and rotated with respect to the adjuster 43 in condition of disengaging the engaging portions 44 from each other, thereby engaging the position setting portion 41 with the reference portion 8F.

The embodiments of the invention shown in FIGS. 13 to 15 are basically the same as the seventh embodiment in FIG. 9, in which an adjuster 48 screwable with the spool shaft 2 abuts against the dragging members 32, at one axial end of spool shaft 2 is not-rotatably but axially movably supported a reference member 85 having a not-round fitting bore 85a, a retaining portion 85b, the reference portion 8G and annular support portion 85c. A retaining recess 48a engageable with the reference portion 85b at the reference member 85 is provided at the front end of the adjuster 48 to prevent the reference member 85 from escaping. Also, to an annular support portion 85c at the reference member 85 is rotatably supported a position setting member 49 having; a plate-like boss 49b having a through bore to be fitted rotatably onto the support portion 85c; projections 49c and 49d projecting from both diametrical sides of the boss 49b and thicknesswise thereof; and a position setting portion 49a. Between the projections 49c and 49d are supported a pair of urging members 50 and 51 in relation of being freely movable radially of the spool shaft 2, the urging members 50 and 51 are biased by a U-like-shaped spring 52 in the direction of being retained to the ends of the projections 49c and 49d, and engaging portions 53 and 54 of spline structure are provided between the urging members 50 and 51 and the front end surface of the adjuster 48, so that the position setting member 49 is rotated together with the adjuster 48 through the engaging portions 53 and 54. Also, the urging members 50 and 51 are urged in the direction of the arrows in FIG. 15 against the spring 52 to disengage the engaging portions 53 and 54 from each other, thereby enabling the position setting member 49 to be rotated with respect to the adjuster 48. The position setting portion 49a is formed of a moving member 55 movable opposite to the reference portion 8G and biased by a spring 56 toward the reference portion 8G.

In this embodiment, the adjuster 48 is screwably operated to set the initial braking force of the dragging members 32, and the position setting member 49 rotates together with the adjuster 48 through the urging portions 50 and 51, thereby disengaging the position setting portion 49a from the reference portion 8G. After the initial braking force is set, the urging members 50 and 51 are urged against the spring 52 and the positioning member 49 is rotated with respect to the adjuster 48 and reference member 85 in condition of disengaging the engaging portions 53 and 54 from each other, thereby engaging the position setting portion 49a with the reference portion 8G. Also, in this embodiment, a pointer 57 is provided on the surface of the reference member 85 and positioned corresponding to the reference portion 8G and an indicator 58 coincident with the pointer 57 is provided on the surface of the position setting member 49 and positioned corresponding to the positioning portion 49a, so that the position setting portion 49a is easy to view with respect to the reference portion 8G from the exterior.

Alternatively, in the embodiments in FIGS. 9 through 15, the pointer or index may be served as the reference portion and the indicator may be served as the position setting portion.

As seen from the above, the drag mechanism for the spinning reel of the invention is provided with the reference portion at one of the reel body 1 or the spool shaft 2 and adjuster for adjusting the braking force of the dragging members 6 and 32, and with the position setting portion having the position setting portion at the other so that the reference portion or the position setting member is made shiftable with respect to the member providing the reference portion or positioning portion, whereby the initial braking force of the dragging members can be set by the adjuster, the braking force of the dragging members can desirably be adjusted with respect to the set braking force, and the adjuster, during the fishing, can be returned to the position where the reference position coincides with the position setting portion and the optimum braking force is simply and accurately obtained.

Although several embodiments have been described, they are merely exemplary of the invention and not to be constructed as limiting, the invention being defined solely by the appended claims.

What is claimed is:

1. A fishing reel comprising a spool and a drag mechanism for applying a braking force against rotation of said spool, said drag mechanism being provided with dragging members, an adjuster comprising an operation portion operable by a fisherman for adjusting the braking force applied by said dragging members, a stationary side member stationary with respect to said spool, a reference portion provided at one of said stationary side member and said adjuster and comprising a single reference position so as to indicate a single position where an optimum braking force is obtained, and a position setting member provided at the other of said stationary side member and said adjuster and having a single position setting portion, one of said reference portion and said position setting member being supported position-changeably with respect to the other of said reference portion and said position setting member, such that said single position setting portion and said single reference position can be made to correspond in position to one another, wherein said stationary side member is a reel body at said spinning reel, provided with a support cylinder, said adjuster being screwably mounted on said support cylinder, said reference portion being provided at said reel body, and said position setting member being supported position-changeably with respect to said reel body, said fishing reel further comprising a reference member having said reference portion, said reference member being supported position-changeably with respect to said reel body.

2. A fishing reel comprising a spool and a drag mechanism for applying a braking force against rotation of said spool, said drag mechanism being provided with dragging members, an adjuster comprising an operation portion operable by a fisherman for adjusting the braking force applied by said dragging members, a stationary side member stationary with respect to said spool, a reference portion provided at one of said stationary side member and said adjuster and comprising a single reference position so as to indicate a single position where an optimum braking force is obtained, and a position setting member provided at the other of said stationary side member and said adjuster and having a single position setting portion, one of said reference portion and said position setting member being supported position-changeably with respect to the other of said reference portion and said position setting member, such that said single position setting portion and said single reference position can be made to correspond in position to one another, wherein said stationary side member is a reel body having a support cylinder at said spinning reel, said adjuster is screwably mounted to said support cylinder, a reference member having said reference portion is provided, said reference member is supported to said reel body to be movable longitudinally relative to said reel body, and said adjuster is provided with said position setting portion corresponding to said reference portion, said position setting portion being of a one-piece construction with said position setting member.

3. A fishing reel comprising a spool and a drag mechanism for applying a braking force against rotation of said spool, said drag mechanism being provided with dragging members, an adjuster comprising an operation portion operable by a fisherman for adjusting the braking force applied by said dragging members, a stationary side member stationary with respect to said spool, a reference portion provided at one of said stationary side member and said adjuster and comprising a single reference position so as to indicate a single position where an optimum braking force is obtained, and a position setting member provided at the other of said stationary side member and said adjuster and having a single position setting portion, one of said reference portion and said position setting member being supported position-changeably with respect to the other of said reference portion and said position setting member, such that said single position setting portion and said single reference position can be made to correspond in position to one another, wherein said stationary side member is a spool shaft supporting said spool, said adjuster being screwably mounted on said spool shaft, said reference portion being provided at a reference member not-relative-rotatably coupled with said spool shaft, and said position setting member being supported position-changeably with respect to said adjuster, wherein said reference member is supported not-relative-rotatably and axially movably with respect to said spool shaft and coupled relative-rotatably with said adjuster, said reference portion being provided at the radially outer surface of said reference member, said position setting member being supported radially movably to said adjuster and movable away from said reference portion, and engageable and disengageable engaging portions being provided between said position setting member and said adjuster.

* * * * *